United States Patent Office.

MORITZIUOS WEISSBERGER, OF ST. PAUL, MINNESOTA.

Letters Patent No. 65,973, dated June 18, 1867.

---

IMPROVED PRINTERS' INK.

---

The Schedule referred to in these Letters Patent and making part of the same.

---

TO ALL WHOM IT MAY CONCERN:

Be it known that I, MORITZIUOS WEISSBERGER, of St. Paul, in the county of Ramsey, and State of Minnesota, have invented a new and useful improvement in Printers' Ink; and I do hereby declare the following to be a full, clear, and exact description thereof, sufficient to enable others skilled in the art to which the invention appertains to make use of it.

This invention consists in combining the mineral resin found in the neighborhood of Petroleum, Ritchie county, West Virginia, in due proportions with the mineral lubricating oil pumped from wells near Parkersburg, West Virginia, and, with lamp-black, forming several varieties of excellent printers' ink.

I have discovered in large quantities in the vicinity of Petroleum, West Virginia, a substance having a strong resemblance to asphaltum, but differing from it in many important particulars, among which may be mentioned the fact that it can be fused only by a strong heat. To this substance, which appears to be closely related to bitumen, I have given the name of mineral resin for the purpose of designating it particularly in the following description of my invention.

No. 1. With four parts of fused mineral resin mixed warm with three parts of common mineral lubricating oil, I make an excellent ink for all fine printing, such as book-work, job-printing, &c. A dryer may be used or not, according as the ink is required to be thick or thin. It is well known that where such semi-liquid substances, composed of bituminous or resinous materials, are to be kept in large quantities or masses together, as by the barrel, their consistency is less than when held divided in small quantities, as by the bottle. This fact will have to be kept in view in mixing all these inks, and if they are designed to be held in large quantities the proportion of resin must be slightly increased. The proportions above given are for quantities not exceeding a few pounds in one mass. The proportions may also be slightly varied to suit the climate in which ink is to be used, employing more oil if for a cold climate and more resin if for a warm one.

No. 2. For making a fine ink for newspaper printing, I use three parts of mineral lubricating oil, mixed as above described, with four parts of fused vegetable resin, and one and a half part of lamp-black made from the refuse of petroleum. A dryer may be used in any desired quantities. The proportion of oil may be increased or diminished according to the temperature of the climate where the ink is to be used, as explained above.

No. 3. Another excellent newspaper ink may be made by substituting, instead of the one and a half part of lamp-black made from refuse petroleum, one and a quarter part of common lamp-black.

These inks I designate, for the purposes of this description, as No. 1, No. 2, and No. 3. Nos. 2 and 3 may be made from No. 1, by the addition of the lamp-black, which is wanting in No. 1. Nos. 2 and 3 differ from each other only in the quality, and as a consequence the quantity of lamp-black employed. The quality of lubricating oil is not always the same, and the proportion used will have to be varied according as it is thick or thin, of good or bad quality. While the above are the usual proportions which I shall employ, I do not intend to limit myself rigidly to them by any means, but shall reserve the right to vary the proportions to suit the different kinds of work, the changes of the seasons, the difference in climates, and the want of uniformity in the quality of any of the ingredients. An ink thus made is so much cheaper than the printing inks now use, that it can be furnished in any quantities at from two-thirds to one-half their market price. It also possesses important advantages over any ink now in use. It does not spread, and it has the rare quality of drying very rapidly on paper, and yet remaining for days upon the ink-roller perfectly moist and ready for use.

Having thus described my invention, what I claim as new, and desire to secure by Letters Patent, is—

The printers ink, above described, compounded and used substantially as and for the purposes specified.

To the above specification of my improvement I have signed my hand this 25th day of May, 1867.

MORITZIUOS WEISSBERGER.

Witnesses:
CHAS. A. PETTIT,
SOLON C. KEMON.